United States Patent [19]

Suda

[11] Patent Number: 5,102,114
[45] Date of Patent: Apr. 7, 1992

[54] DEVICE FOR DETECTING CARRY-OUT OF LAST GLASS SHEET FROM STACKING STAND

[75] Inventor: Haruhisa Suda, Mie, Japan

[73] Assignee: Central Glass Company, Limited, Ube, Japan

[21] Appl. No.: 627,836

[22] Filed: Dec. 17, 1990

[30] Foreign Application Priority Data

Dec. 18, 1989 [JP] Japan .............................. 1-145619[U]

[51] Int. Cl.$^5$ .............................................. B65H 7/04
[52] U.S. Cl. ........................................ 271/18; 271/90; 271/260; 901/40
[58] Field of Search ......................... 271/18, 90, 94, 96, 271/110, 258, 260; 901/40; 414/795.4; 269/21

[56] References Cited

U.S. PATENT DOCUMENTS

| | | | |
|---|---|---|---|
| 3,966,197 | 6/1976 | Riedl et al. | 271/260 |
| 4,369,964 | 1/1983 | Jinnai et al. | 271/260 |
| 4,861,008 | 8/1989 | Steek et al. | 269/21 |
| 4,936,566 | 6/1990 | Hiramatsu | 271/260 |

FOREIGN PATENT DOCUMENTS 56-7910 2/1981 Japan .

OTHER PUBLICATIONS

Westermann, K. H., "Pressure/Vacuum Sensing Device", *IBM Technical Disclosure Bulletin*, vol. 24, No. 5, pp. 2526–2527 (Oct. '81).

*Primary Examiner*—Robert P. Olszewski
*Assistant Examiner*—Steven M. Reiss
*Attorney, Agent, or Firm*—Fleit, Jacobson, Cohn, Price, Holman & Stern

[57] ABSTRACT

A detecting device is provided for detecting carry-out of a last glass sheet from a stacking stand. The detecting device comprises a suction cup releasably attached with a suction force to the last glass sheet, and a sensor for detecting attachment and detachment to and from the last glass sheet and producing electrical signals representative thereof. The signals from the sensor are supplied to a robot or the like for the above carry-out for stopping the robot or the like when the sensor detects detachment of the suction cup from the last glass sheet.

7 Claims, 1 Drawing Sheet

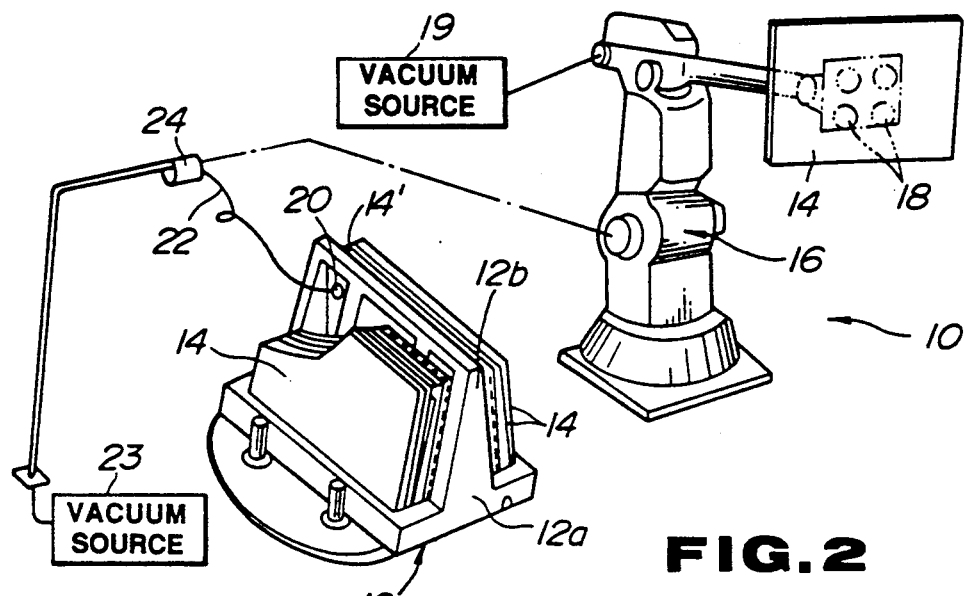
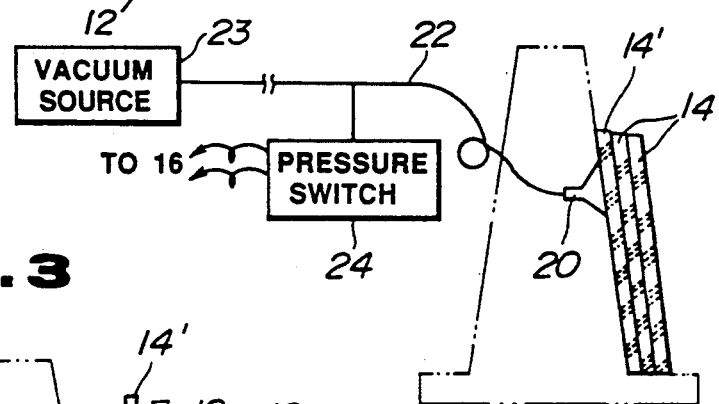
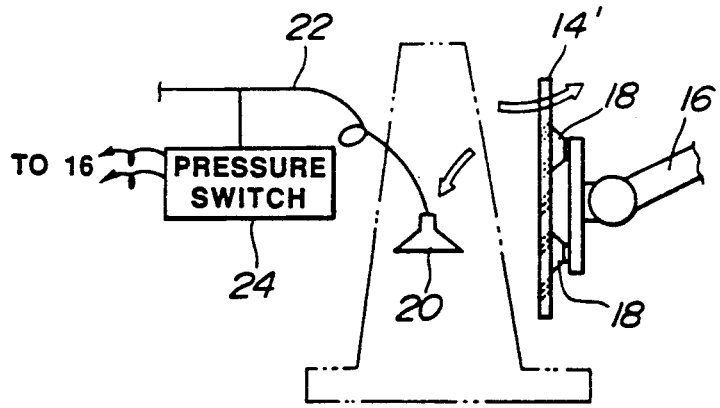
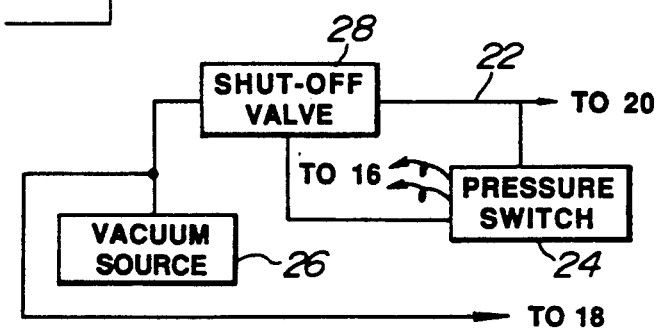

DEVICE FOR DETECTING CARRY-OUT OF LAST GLASS SHEET FROM STACKING STAND

BACKGROUND OF THE INVENTION

1. Field of the Invention

The present invention relates in general to a glass sheet supply system for taking or carrying glass sheets one by one out of a stacking stand and supplying them to a next production process by using a robot or the like and more particularly to a detecting device for detecting carry-out of the last glass sheet from the stacking stand for stopping the robot or the like.

2. Description of the Prior Art

A device for detecting conveyance of a galss sheet by using a photosensor is known as disclosed in Japanese Utility Model Publication No. 56-7910.

Such a photosensor, when used for detecting whether a glass sheet remains in a stacking stand, is liable to detect the upstanding rest of the stacking stand on which glass sheets are stacked and rest or a wrapping of a glass sheet erroneously. Such an erroneous detection can be prevented by making higher the accuracy of the sensor but a difficult and intricate adjustment and a high cost will result.

SUMMARY OF THE INVENTION

In accordance with the present invention, there is provided a device for detecting carry-out of a last glass sheet from a stacking stand. The device comprises a vacuum source, a suction cup fluidly connected to the vacuum source and releasably attached with a suction force to the last glass sheet, and a sensor for detecting attachment and detachment of the suction cup to and from the last glass sheet and producing electric signals representative thereof.

This structure is effective for overcoming the above noted disadvantage or shortcoming inherent in the prior art device.

It is accordingly an object of the present invention to provide a novel and improved detecting device which can assuredly detect if any glass sheet remains in a glass sheet stacking stand.

It is another object of the present invention to provide a novel and improved detecting device of the above described character which can assuredly detect carry-out of a last glass sheet from a glass sheet stacking stand and stop an associated robot or the like for performing the above carry-out.

It is a further object of the present invention to provide a novel and improved detecting device of the above described character which can assuredly prevent the glass sheet stacking stand and the robot or the like from being damaged due to an erroneous detection.

It is a further object of the present invention to provide a glass sheet supply system which is provided with a detecting device of the above described character.

BRIEF DESCRIPTION OF THE DRAWINGS

FIG. 1 is a perspective view of a glass sheet supply system provided with a detecting device according to an embodiment of the present invention;

FIG. 2 is a fragmentary side elevation of the glass sheet supply system of FIG. 1, with the detecting device in a state of detecting storage of the last glast sheet in the stacking stand;

FIG. 3 is a view similar to FIG. 2 but shows the device in a state of detecting carry-out of the last glass sheet from the stacking stand; and FIG. 4 is a fragmentary schematic view of a glass sheet supply system according to a modification of the present invention.

DESCRIPTION OF THE PREFERRED EMBODIMENTS

In FIG. 1, a glass sheet supply system is generally indicated by 10 and includes a glass sheet stacking stand 12 consisting of a base plate 12a and an upstanding rest 12b having inclined opposite side surfaces on which a plurality of glass sheets are stacked and rest. A robot 16 having a plurality of suction cups 18 for releasably holding thereon a glass sheet 14 with a suction force is exemplarily shown and program-controlled to repeat a preset operation, i.e., to carry the glass sheets 14 one by one out of the stacking stand 12 and supply them to a next production process or a predetermined place. The suction cups 18 are fluidly connected to a vacuum source 19 as a suction pump.

A small-sized suction cup 20 is releasably attached with a suction force to a last glass sheet 14' which is the last to be carried out of the stacking stand 12. The suction cup 20 is fluidly connected through a pipe 22 to a vacuum source 23 such as a suction pump. The suction force with which the suction cup 20 is attached to the last glass sheet 14' is set smaller than the suction force with which the suction cups 18 hold thereon a glass sheet 14.

As shown in FIGS. 2 and 3, the pipe 22 is provided with a pressure sensor such as a pressure switch 24 which is switched on when the pressure in the pipe 22 is lower than a predetermined value and switched off when the pressure in the pipe 22 is higher than a predetermined value.

The pressure switch 24 is electrically connected to the robot 16 to supply thereto electrical signals representative of attachment and detachment of the suction cup 20 to and from the last glass sheet 14'. That is, when the robot 16 carries the last glass sheet 14' out of the stacking stand 12 to cause detachment of the suction cup 20 from the last glass sheet 14' as shown in FIG. 3, the pressure in the pipe 20 is increased above a predetermined value to cause the pressure switch 24 to be switched off. The pressure switch 24 thus supplies an OFF signal to the robot 16 for stopping the same after completion of supply of the last glass sheet 14' to a next production process or a predetermined place. The pressure switch 24 remains switched on during storage of the last glass sheet 14' in the stacking stand 12 as shown in FIG. 2, thus supplying an ON signal to the robot 16 to enable the same to operate.

In the above, it will be understood that even if the small-sized suction cup 20 is detached from the last glass sheet 14' before the last glass sheet 14' is held by the suction cups 18 of the robot 16 it is only stoppage of the robot 16 what is caused thereby, thus assuring to prevent an erroneous operation causative of damage of the stacking stand 12 and the robot 16.

It will be further understood that, as shown in FIG. 4, the suction cups 18 of the robot 16 and the small-sized suction cup 20 may be fluidly connected to a common vacuum source 26, provided that a shut-off valve 28 is disposed in the pipe 22 to shut off the same when the small-sized suction cup 20 is detached from the last glass sheet 14' such that the suction force with which the suction cups 18 of the robot 16 are attached to a glass sheet 14 is not substantially varied in response to detachment of the small-sized suction cup 20 from the last glass sheet 14'.

What is claimed is:

1. A glass sheet supply system comprising:
   a stacking stand for stacking thereon a plurality of glass sheets;
   means for automatically carrying the glass sheets one by one out of said stacking stand and supplying them to a predetermined place;
   a vacuum source;
   a suction cup fluidly connected to said vacuum source and releasably attached with a suction force to last one of the glass sheets which is the last to be carried out from said stacking stand; and
   a sensor for detecting attachment and detachment of said suction cup to and from the last one of the glass sheets and supplying electrical signals representative thereof to said means such that said means stops operating when said suction cup is detached from the last one of the glass sheet.

2. The system according to claim 1, wherein said sensor comprises a pressure switch which is switched on when a pressure in said suction cup is higher than a predetermined value and switched off when the pressure in said suction cup is lower than a predetermined value.

3. The system according to claim 2, wherein said means comprises a robot having a second vacuum cup which is attached with a suction force to one of the glass sheets to be carried out of said stacking stand.

4. The system according to claim 3, wherein a suction force with which said second suction cup is attached to the glass sheets is larger than that with which said first mentioned suction cup is attached to the last one of the glass sheets.

5. The system according to claim 4, wherein said first mentioned suction cup and said second suction cup are commonly connected to said vacuum source.

6. The system according to claim 5, further comprising a shut off valve installed in a pipe connecting said first mentioned suction cup to said vacuum source to shut off said pipe when said vacuum switch detects detachment of said suction cup from the last one of the glass sheets.

7. The system according to claim 6, wherein said stacking stand comprises a base plate and an upstanding rest on which the glass sheets are stacked and rest.

* * * * *